United States Patent
Pecher et al.

(10) Patent No.: US 10,634,119 B2
(45) Date of Patent: Apr. 28, 2020

(54) METHOD OF OPERATING A WIND TURBINE YAW ASSEMBLY

(71) Applicant: SIEMENS GAMESA RENEWABLE ENERGY A/S, Brande (DK)

(72) Inventors: Arthur Pecher, Middlefart (DK); Taus Wind-Larsen, Aarhus C (DK)

(73) Assignee: SIEMENS GAMESA RENEWABLE ENERGY A/S (DK)

( * ) Notice: Subject to any disclaimer, the term of this patent is extended or adjusted under 35 U.S.C. 154(b) by 24 days.

(21) Appl. No.: 16/112,862

(22) Filed: Aug. 27, 2018

(65) Prior Publication Data

US 2019/0072074 A1 Mar. 7, 2019

(30) Foreign Application Priority Data

Sep. 4, 2017 (EP) ..................................... 17189234

(51) Int. Cl.
*F03D 7/02* (2006.01)
*F03D 7/04* (2006.01)
*F03D 17/00* (2016.01)

(52) U.S. Cl.
CPC .......... *F03D 7/042* (2013.01); *F03D 7/0204* (2013.01); *F03D 17/00* (2016.05); *F05B 2260/4031* (2013.01); *F05B 2260/80* (2013.01); *F05B 2270/101* (2013.01)

(58) Field of Classification Search
None
See application file for complete search history.

(56) References Cited

U.S. PATENT DOCUMENTS

| 2010/0004087 A1* | 1/2010 | Minegishi ............. F03D 7/0204 475/180 |
| 2011/0006541 A1* | 1/2011 | Frederiksen .......... F03D 7/0204 290/55 |
| 2011/0171026 A1* | 7/2011 | Kolpin .................. F03D 7/0204 416/9 |
| 2013/0115043 A1 | 5/2013 | Lucente |

(Continued)

FOREIGN PATENT DOCUMENTS

| CN | 104514684 A | 4/2015 |
| DE | 102011101140 A1 | 11/2012 |

(Continued)

OTHER PUBLICATIONS

Non-English Chinese Office Action dated Oct. 16, 2019 for Application No. 201811026271.9.

*Primary Examiner* — Michael Lebentritt
(74) *Attorney, Agent, or Firm* — Schmeiser, Olsen & Watts LLP.

(57) ABSTRACT

The disclosed describes a method of operating a wind turbine yaw assembly comprising a yaw ring and a number of yaw drive units, wherein a yaw drive unit comprises a pinion arranged to engage with the yaw ring, which method comprises the steps of identifying a damaged tooth on the yaw ring; providing damage descriptor parameters to the yaw drive controller; and controlling a yaw drive unit on the basis of the damage descriptor parameters to reduce the force exerted by its pinion on a damaged tooth. The disclosed further describes a wind turbine yaw assembly, a wind turbine, and a computer program product.

15 Claims, 5 Drawing Sheets

(56) References Cited

U.S. PATENT DOCUMENTS

| | | | |
|---|---|---|---|
| 2014/0152013 A1* | 6/2014 | Spruce | F03D 7/0204 |
| | | | 290/44 |
| 2015/0047270 A1 | 2/2015 | Gotfredsen | |
| 2015/0275858 A1 | 10/2015 | Frederiksen et al. | |
| 2015/0377219 A1* | 12/2015 | Nohara | F03D 80/88 |
| | | | 416/170 R |
| 2017/0241535 A1* | 8/2017 | Brown | F16H 55/17 |
| 2018/0238393 A1* | 8/2018 | Winslow | F16B 35/04 |
| 2018/0274519 A1* | 9/2018 | Manteuffel | F16H 55/17 |
| 2019/0048848 A1* | 2/2019 | Glavind | F03D 7/0204 |
| 2019/0195196 A1* | 6/2019 | Winslow | F03D 7/0204 |
| 2019/0285052 A1* | 9/2019 | Winslow | F16D 65/092 |

FOREIGN PATENT DOCUMENTS

| | | | |
|---|---|---|---|
| EP | 1571334 A1 | 9/2005 | |
| EP | 2253841 A2 | 11/2010 | |
| EP | 2546518 A1 | 1/2013 | |
| EP | 2708738 A1 | 3/2014 | |

\* cited by examiner

METHOD OF OPERATING A WIND TURBINE YAW ASSEMBLY

CROSS-REFERENCE TO RELATED APPLICATIONS

This application claims priority to European application No. 17189234.2 having a filing date of Sep. 4, 2017 the entire contents of which are hereby incorporated by reference.

FIELD OF TECHNOLOGY

The following describes a method of operating a wind turbine yaw assembly. The following further describes a wind turbine yaw assembly, a wind turbine, and a computer program product.

BACKGROUND

A wind turbine used to generate power to feed into the electricity grid generally comprises a nacelle mounted on top of a tower. An aerodynamic rotor with blades mounted to a hub is generally found at the "front" of the nacelle, and the generator itself is housed inside the nacelle. To maximise the amount of energy that can be extracted from the wind, it must be possible to turn the nacelle so that the aerodynamic rotor can always face directly into the wind. To this end, the nacelle is generally mounted to the tower by means of a yaw assembly. The yaw assembly can comprise a toothed yaw ring mounted to the top of the tower. The yaw ring can be constructed so that the yaw ring teeth face outwards (to the exterior of the tower) or inwards (into the interior of the tower). The yaw assembly comprises a number of yaw motors with gear pinions that engage with the yaw ring. By appropriately controlling the yaw motors, the entire nacelle can be rotated in the desired direction and by the desired amount. The teeth of the yaw ring are subject to wear and tear. A fractured yaw ring tooth is weakened and may even break off completely. When a yaw ring is missing a tooth, the yaw gear pinion cannot mesh correctly with the yaw ring any more. As a result, the yaw gear pinion may suffer damage and may also cause further damage to the yaw ring. Another possible source of damage to the yaw ring can be foreign objects that inadvertently come between the yaw ring and a yaw drive pinion.

While it is possible to repair a damaged or broken yaw ring tooth, for example by welding a new tooth into place, or by adding a suitably shaped plate to the yaw ring to simulate a tooth, a repaired tooth or replacement plate is a relatively weak element and will never have the same strength properties as an undamaged tooth. However, the present designs do not provide for any way of avoiding loading of such a weak element. If the repaired yaw ring tooth should fail again, the yaw ring will need to be replaced. This is a very costly operation, since the entire nacelle must be detached and lifted upward (for example using a jackup crane) to allow the damaged yaw ring to be removed through the space between the tower and the raised nacelle and to allow a replacement yaw ring to be installed. This procedure is very expensive, hazardous, and time-consuming. One way of reducing the cost of such a procedure is to use a segmented yaw ring instead of a one-piece yaw ring. However, a drawback of such a segmented yaw ring is that it is often more complex than a normal one-piece yaw ring, and therefore more expensive to manufacture. There are no recognized design standards for segmented yaw rings. Furthermore, it is difficult to evaluate the influence of the transition from one segment to another. Another drawback of a segmented yaw ring design is that it requires more space. In any case, the teeth of a segmented yaw ring are just as liable to become damaged over time, and the replacement of a yaw ring segment is also associated with cost, safety risk, and effort.

SUMMARY

An aspect relates to an improved way of dealing with a damaged yaw ring tooth.

A wind turbine yaw assembly generally comprises a yaw ring and a number of yaw drive units. A yaw drive unit generally has a pinion arranged to engage with the yaw ring in order to effect a rotation of a nacelle relative to a tower of the wind turbine. According to the invention, the method of operating a wind turbine yaw assembly comprises the steps of identifying a damaged tooth on the yaw ring; providing damage descriptor parameters to the yaw drive controller; and controlling a yaw drive unit on the basis of the damage descriptor parameters to reduce the force exerted by its pinion on a damaged tooth.

An advantage of the inventive method is that a defective yaw ring—i.e. a yaw ring with one or more damaged or broken teeth—may continue to be used for an indefinite length of time. The inventive method can therefore postpone an expensive yaw ring replacement procedure, while allowing continued operation of the wind turbine. As a result, even a wind turbine with a damaged yaw ring can continue to generate revenue. This contrasts favourably with known art methods that involve taking a wind turbine out of operation until its damaged yaw ring can be replaced. The inventive method deliberately reduces or eliminates loading on a damaged tooth, i.e. any damaged or weakened yaw ring tooth will not be loaded (or will be only partially loaded) by a passing pinion, for example during an active yawing procedure or during a sliding event in which the passive yaw brakes are engaged. The pinion of a yaw drive unit will mesh with the damaged tooth in the usual manner, but will at most transmit only a very reduced load to the damaged tooth.

As mentioned above, a prior art method of dealing with a damaged yaw ring tooth may involve repairing the damaged tooth, but even a repaired tooth cannot be loaded in the normal manner, so that such repair efforts can only win a relatively short reprieve before the yaw ring must be replaced. The inventive method takes a different approach. Instead of repairing a damaged tooth and only postponing the replacement procedure by a relatively short time, the yaw assembly is driven to avoid excessively loading any damaged tooth. The only compromise that results from this approach may be that the yawing or braking capacity of the yaw assembly is slightly reduced. However, because the damaged tooth or teeth are not actively used (i.e. loaded) during yawing, the presence of a damaged tooth is no longer a problem, and the wind turbine can remain in use for an indefinite length of time before ultimately replacing its yaw ring. A replacement of the yaw ring may even be postponed until the yaw capacity or braking capacity reaches a point at which the economic benefit (of continued operation with damaged yaw teeth) is outweighed by the costs. Various parameters contribute to such a decision, for example the age of the wind turbine and its expected lifetime, reduction in power output of the wind turbine due to insufficient yawing under large yaw moments or excessive sliding, etc.

According to the invention, the wind turbine yaw assembly is arranged at an interface between a nacelle and a tower, and comprises a yaw ring with an annular arrangement of teeth; a number of yaw drive units, wherein a yaw drive unit comprises a motor and a pinion arranged to engage with teeth of the yaw ring; and a yaw drive controller adapted to control the motors of the yaw drive units to effect a rotation of the nacelle relative to the tower. The inventive yaw assembly further comprises a damage descriptor input for providing one or more damage descriptor parameters to the yaw drive controller, and the yaw drive controller is further adapted to reduce the force exerted by a pinion of a yaw drive unit on a damaged tooth on the basis of the damage descriptor parameters.

According to the invention, the wind turbine comprises an embodiment of the inventive yaw assembly, and can advantageously be kept in operation even if its yaw ring suffers from one or more damaged or broken teeth. The inventive wind turbine can therefore advantageously continue to generate revenue even in the presence of such damage.

According to the invention, a computer program product (non-transitory computer readable storage medium having instructions, which when executed by a processor, perform actions) comprises a computer program that is directly loadable into a memory of a yaw drive controller of a wind turbine yaw assembly and which comprises program elements for performing steps of the inventive method when the computer program is executed by the yaw drive controller. An advantage of the inventive computer program product is that it can be used to upgrade an existing yaw drive controller with little effort. It is only necessary to provide some way of precisely identifying a damaged yaw ring tooth to the controller, so that the controller can issue appropriate signals to each yaw drive unit accordingly.

Particularly advantageous embodiments and features of the invention are given by the dependent claims, as revealed in the following description. Features of different claim categories may be combined as appropriate to give further embodiments not described herein.

A yaw ring can be an interior ring (its teeth face towards inside of the wind turbine tower) or an exterior ring (its teeth face towards the outside of the wind turbine tower). In the diagrams supporting the following discussion, an exemplary yaw ring is arranged so that its teeth face towards the exterior of the wind turbine tower, but the inventive method and inventive yaw drive assembly are equally applicable to an interior yaw ring. The yaw ring may be a segmented yaw ring or a one-piece yaw ring.

In the inventive method, the step of reducing the force exerted by a pinion on a damaged tooth may be assumed to be carried out during a rotation of the yaw ring. However, the step of reducing the force exerted by a pinion on a damaged tooth is equally applicable during a "braking" procedure, when the yaw drive motors are actuated to hold the nacelle in a specific position relative to the tower. Such a braking procedure may be required during high wind loads that result in high yaw moments, for example in turbulent or gusty wind conditions, which can result in an unwanted yawing of the nacelle referred to as "sliding". In a preferred embodiment of the invention, each yaw drive unit comprises a passive brake assembly. Such a brake assembly is released when power is supplied to the yaw drive unit and therefore acts a safety brake in the event of a fault. The inventive method deliberately reduces or eliminates loading on a damaged tooth, i.e. any damaged or weakened yaw ring tooth will not be loaded (or will be only partially loaded) by a passing pinion during such a sliding event. For example, during a sliding event, the brake on the respective yaw drive can be released for a short moment as the pinion passes a damaged tooth.

A yaw assembly could comprise a single yaw drive unit with a motor that is sufficiently powerful to turn the nacelle relative to the tower. However, a yaw assembly generally comprises several yaw drive units that collectively apply the necessary torque, so that the motors can be relatively small. Preferably, a yaw drive assembly comprises a redundant arrangement of yaw drive units, for example two groups of two or more yaw drive units, arranged on opposite sides of a yaw ring. In the following, but without restricting the invention in any way, it may be assumed that the yaw assembly comprises such a redundant arrangement.

As explained above, during a yaw procedure the yaw drive units are controlled so that the yaw drive motors turn the pinions in a desired direction (clockwise or counter-clockwise) at a certain rotational speed, and to exert a certain force when the pinion teeth mesh with the yaw ring teeth. In a preferred embodiment of the invention, the step of controlling a specific yaw drive unit to reduce the force exerted by its pinion on a damaged tooth comprises reducing the rotational speed of a motor of that yaw drive unit as its pinion passes the tooth. The other yaw drive motors may continue to be operated as usual, while a yaw drive motor whose pinion is passing a damaged tooth will be driven at reduced power for the corresponding short length of time. A yaw drive motor whose pinion is passing a damaged tooth may be temporarily given a reduced torque limit (e.g. 1%), but may continue operating at the same speed). For the short length of time during which a pinion is passing a damaged tooth, the overall yaw capacity of the yaw assembly might be slightly reduced, which might lead to a reduced yawing speed.

In a further preferred embodiment of the invention, the step of controlling a yaw drive unit to reduce the force exerted by its pinion on the damaged tooth comprises reducing the torque of the motor of that yaw drive unit. The extent to which torque is reduced may depend on the nature of the damage. A welded-on replacement tooth may be dealt with in a different manner than a guiding plate replacing a broken tooth, for example.

The damage descriptor parameters can identify a damaged tooth in any suitable manner. In a preferred embodiment of the invention, a damaged tooth is identified to the controller by establishing its position relative to a reference point known to the controller of the yaw assembly. For example, the yaw drive controller may "know" the position of each yaw drive unit in a yaw bedframe, and may "know" the position of the yaw bedframe relative to an initial position. A reference point can comprise a north reference of the yaw ring, and the position of the yaw bedframe may be precisely defined in relation to this north reference. In this exemplary embodiment, the controller is also informed of the number of yaw ring teeth. The yaw drive controller is preferably configured to track the position of a damaged tooth relative to each pinion of each yaw drive unit. For example, during a visual inspection by a person, robot or camera, the position of a damaged tooth can be identified by counting the yaw ring teeth, starting at a reference mark. This can be a reference mark that is already present, for example on the yaw ring and/or on the yaw bedframe. Normally, in wind turbine design, such a reference mark is agreed on and made in a suitable location to ensure correct alignment of the yaw ring.

A broken or damaged yaw ring tooth can be identified during visual inspection by a service technician, for example during a routine service check, by a camera system, or by any suitable detection means. The technician can inform the yaw drive controller of the position of the damaged tooth by means of a suitable user interface. The technician can also estimate the severity of the damage, and can enter this information also.

Alternatively or in addition, a broken or damaged yaw ring tooth can be identified by monitoring appropriate signals of the yaw drives. For example, since a damaged tooth is weakened, it will "give" to some extent when loaded by a pinion tooth. This can result in an increase in torque as the pinion attempts to mesh with the damaged tooth. The yaw drive controller can detect a damaged tooth by monitoring the current, the rotational speed or any other relevant signals of the yaw drives, for example. Alternatively, a controller can monitor suitable signals of frequency converters or suitable sensors such as one or more acoustic sensors positioned in the vicinity of the yaw ring. With such information, the yaw drive controller may be adapted to determine the presence of a damaged tooth, and to identify its location on the yaw ring using the known reference information.

At any one instant, therefore, the yaw drive controller knows which pinion is meshing with a specific tooth or group of teeth of the yaw ring. A damaged tooth may be identified to the yaw drive controller by its position on the yaw ring. For example, in the case of a yaw ring with 120 teeth, these may be counted from 1 to 120 starting at the north reference. If the 30th tooth is damaged, it may be identified to the yaw drive controller as "tooth 30", "tooth 30/120", etc.

While the pinion of a yaw drive unit passes a damaged tooth, the torque of that yaw drive unit can be reduced as explained above. The remaining yaw drive units may deliver a slightly higher torque to compensate. Usually, in a redundant system, the remaining yaw drive units will simply be operated without any alteration to torque. This can avoid any undesirable over-loading of the remaining yaw drive motors.

As indicated above, a yaw motor brake is a passive brake, meaning its unpowered or normal state is "on", i.e. applied, and the brake is released when power is supplied to the yaw drive unit. In the absence of power to the yaw drive unit, the brake is "on", as a safety measure. The yaw drive brakes are used to prevent unintentional yawing of the nacelle, i.e. to prevent a yawing motion when a yaw procedure is not actually being carried out. The brake load is generally shared by all yaw drive units. In a preferred embodiment of the invention, a yaw drive unit will be controlled so that its pinion teeth will not apply any load—or only a greatly reduced load—on a defective yaw ring tooth during braking.

In a preferred embodiment of the invention, the computer program comprises program elements realized to identify a yaw ring region containing a damaged tooth and to adjust control signals of a yaw drive unit as the yaw drive unit passes that region of the yaw ring. In the case of a single damaged tooth, a yaw ring region may cover only that one damaged tooth. For example, in the case of a yaw ring comprising 120 teeth, the yaw ring region with the damaged tooth may cover the angular region spanning 3°. A yaw drive motor is controlled so that its pinion only exerts a reduced force (or no force at all) on the damaged tooth as the pinion passes through that region. Of course, the yaw ring region with the damaged tooth may cover a larger span, and may for example include the undamaged teeth on either side. Using the above example, a yaw ring region with the damaged tooth may cover an angular region spanning 9°.

The invention can even cover a situation in which a series of two or more consecutive teeth are damaged. Damage to consecutive teeth may arise from a faulty or damaged pinion, for example. A sufficiently large yaw ring region may be defined as described above, and the yaw drive motors are controlled so that their pinions exert reduced force or no force as they pass through that region.

BRIEF DESCRIPTION

Some of the embodiments will be described in detail, with references to the following Figures, wherein like designations denote like members, wherein.

In the diagrams, like numbers refer to like objects throughout. Objects in the diagrams are not necessarily drawn to scale.

DETAILED DESCRIPTION

Figure 1:
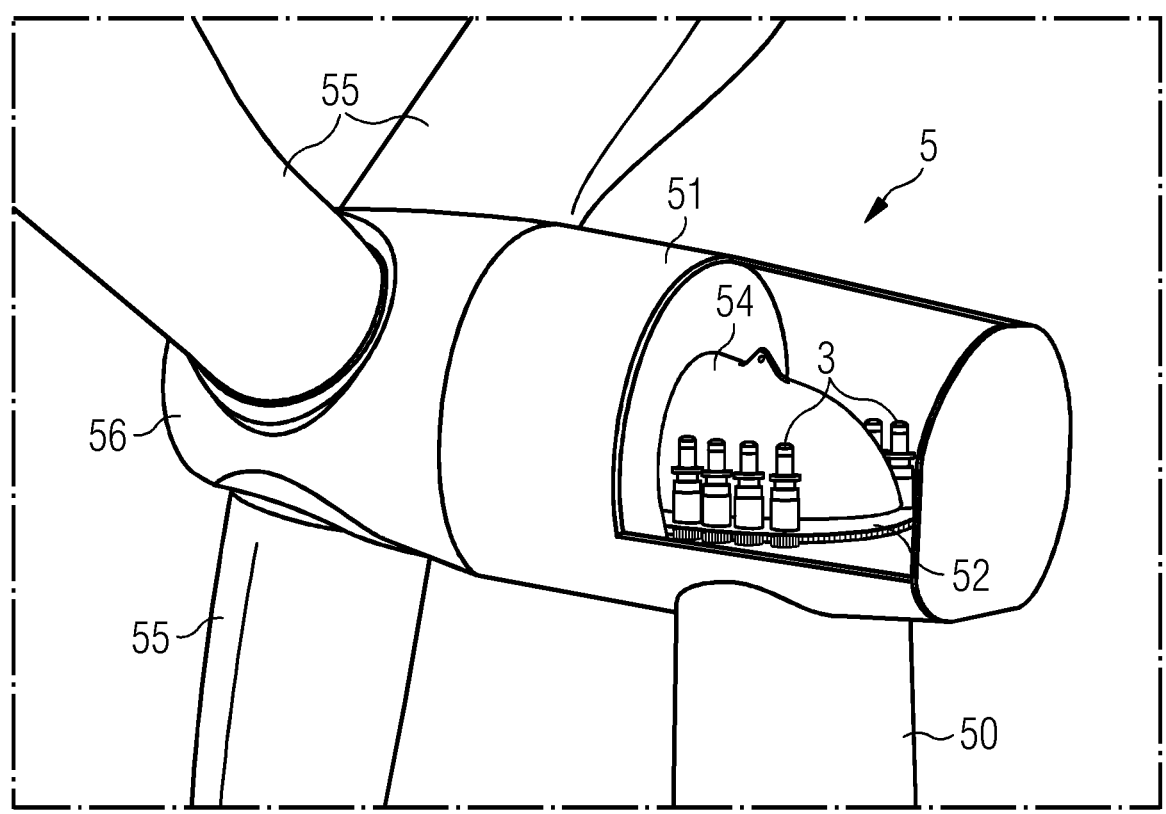
FIG. 1 shows a wind turbine.

FIG. 1 shows a cutaway view into a nacelle of a direct-drive wind turbine 5. The diagram shows the nacelle 51 mounted on a tower 50. An aerodynamic rotor 55, 56 at the front of the nacelle comprises rotor blades 55 mounted to a hub 56, which turns the rotor of a generator. The generator (not visible in the diagram) is mounted to a support structure 54. To be able to turn the nacelle 51 so that the aerodynamic rotor faces into the wind, a toothed yaw ring is mounted to the tower, and a several yaw drive units 3 are arranged so that their pinions engage with the teeth of the yaw ring. The yaw drive units 3 are securely held in place by a yaw bedframe 52, which can be part of the support structure 54. By appropriate design of the yaw assembly—the dimensions of the yaw ring and pinions, the number of yaw drive units, the power of the yaw drive motors, etc.—the entire nacelle may be rotated very precisely relative to the tower.

Figure 2:
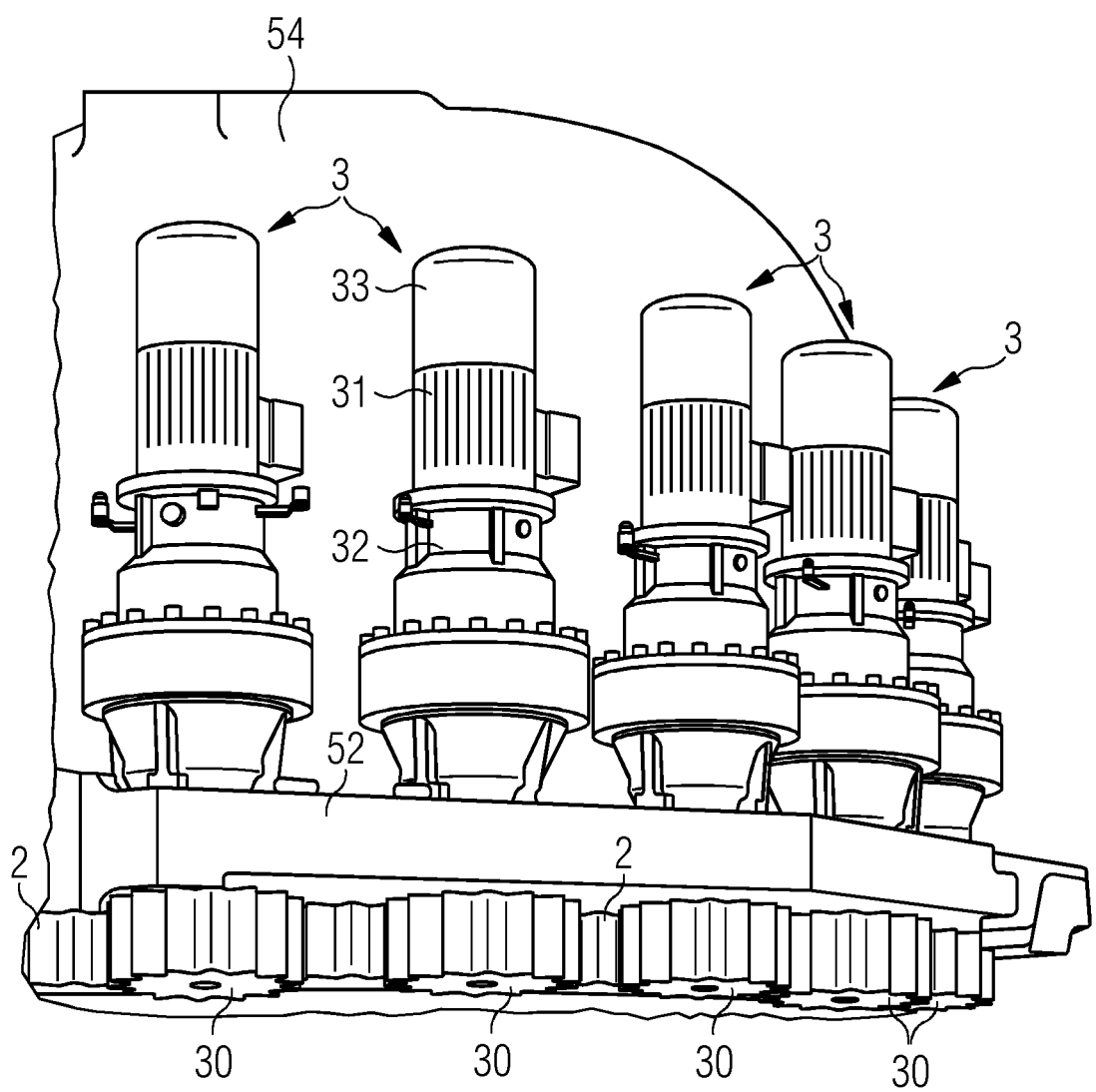
FIG. 2 shows a side view of a yaw assembly in a direct-drive wind turbine.

FIG. 2 shows a side view of a yaw assembly of the type described in FIG. 1, showing the arrangement of the yaw drive units 3 in more detail. The diagram also shows the yaw ring 2, which is mounted close to the top of the tower on the outside. Each motor 3 has a pinion 30 which is mounted on a shaft that extends through a yaw bedframe 52, and the body of the yaw drive unit 3 is secured to the bedframe 52. The yaw bedframe 52 is securely mounted to the bedframe 54. Each yaw drive unit 3 further comprises a motor 31, a gearbox 32, and a brake 33. The yaw drive motors 31 are electrically powered. For the sake of clarity, the power supply is not shown, but the skilled person will be familiar with this aspect. A controller (also not shown) actuates the yaw drive motors to turn the pinions either clockwise or counter-clockwise, depending on the direction in which the nacelle is to be rotated. The controller also determines the speed of rotation of the pinions 30, and the pinion torque. The forces applied by the pinion teeth to the yaw ring teeth can be quite large, depending on the wind conditions, the speed, extent and frequency of turning procedures, etc. The teeth of the yaw ring 2 and the teeth of the pinions 30 are therefore subject to wear and tear during operation of the wind turbine. A tooth can fracture, crack or even break off entirely at some point. A fractured or broken tooth may be detected during a visual inspection of the yaw assembly, or may be detected by a controller of the yaw drive units. While it is possible to replace a yaw drive unit 3 with relatively little effort, replacement of the yaw ring 2 is a very expensive operation.

Figure 3:
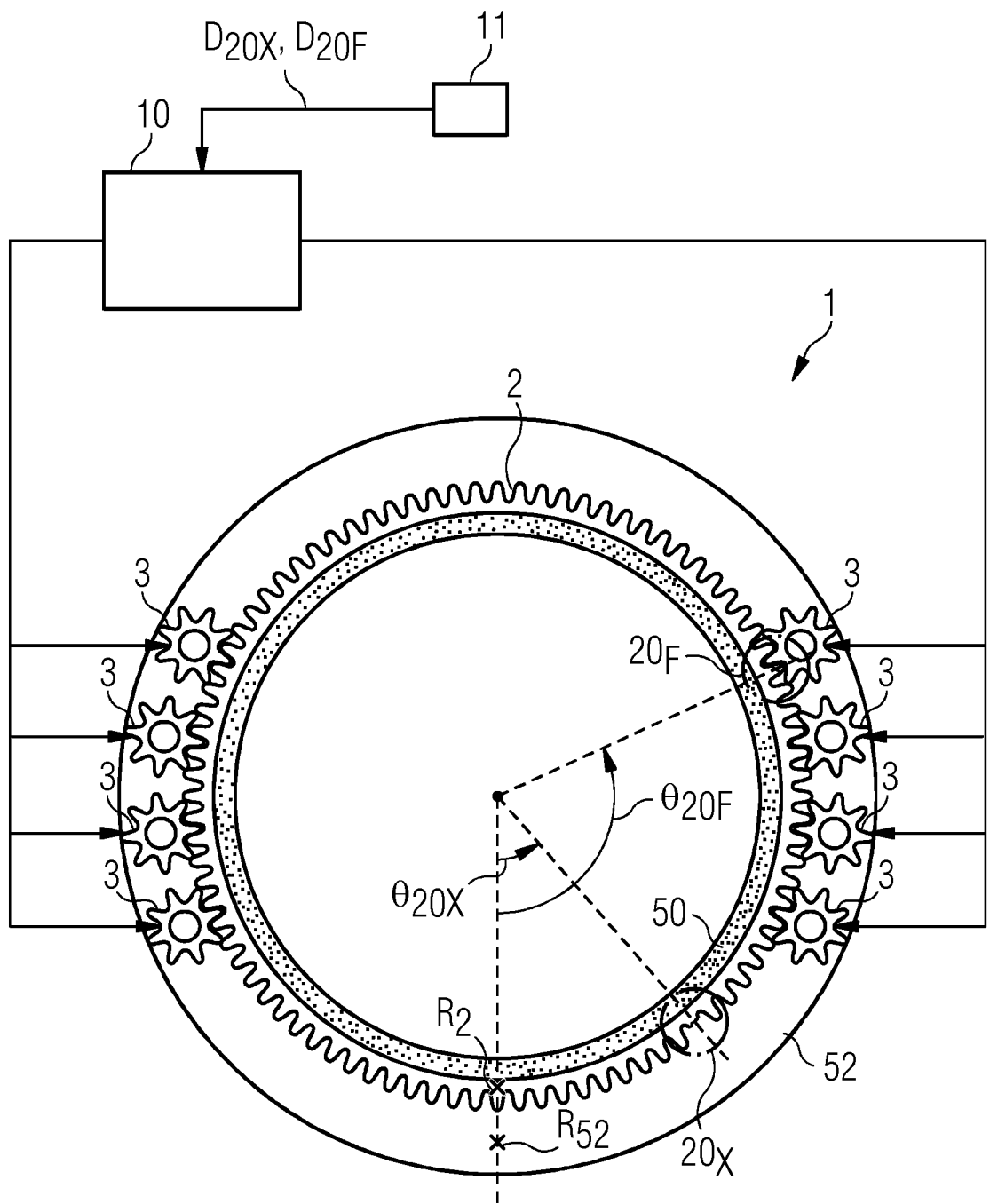
FIG. 3 shows a schematic representation of an embodiment of the inventive wind turbine yaw assembly.

FIG. 3 shows a schematic representation of an embodiment of the inventive wind turbine yaw assembly 1. The diagram shows an outer yaw ring 2 mounted to a tower 50, and an arrangement of yaw drive units 3, in two groups of four. The yaw drive units 3 are held in place by a yaw bedframe 52, which rotates as one with the nacelle (not shown), and may be assumed to have the same design illustrated in FIG. 1 and FIG. 2 above. The yaw ring 2 is stationary, and the entire nacelle (with yaw bedframe and yaw assembly) rotates relative to the stationary yaw ring 2. The number of teeth on the yaw ring will depend to some extent on the diameter of the yaw ring. A controller 10 keeps track of the positions of the yaw drive units 3. In this exemplary embodiment of the inventive wind turbine yaw assembly 1, the controller 10 is configured to track the position of each yaw drive unit 3 relative to a reference. For example, a specific initial configuration may be given when a reference point $R_2$ of the yaw ring 2 is aligned with a reference point $R_{52}$ of the bedframe 52. The invention deploys a suitable algorithm to track the yaw drive units 3, so that the controller 10 can always "know" the position of each yaw drive unit 3 relative to the reference point $R_2$ on the yaw ring 2. In the inventive method, the controller 10 is also provided with a damage descriptor for any damaged tooth, particularly for any damaged tooth of the yaw ring 2. The diagram shows two such damaged teeth $20_F$, $20_X$: a fractured tooth $20_F$ and a broken tooth $20_X$ (in the circled regions of the yaw ring 2). The damaged teeth $20_F$, $20_X$ may have been detected during a visual inspection of the yaw assembly, or may have been detected by the controller 10 if this is configured to interpret feedback from the yaw drive units 3. The position of each damaged tooth is expressed relative to the reference point $R_2$ of the yaw ring 2.

Since the pinion of a yaw drive unit 3 is actuated in a well-defined manner (e.g. using an asynchronous motor as the yaw drive motor), the inventive method even allows the controller 10 to "know" which tooth of a pinion is engaging with a specific tooth of the yaw ring 2. With this precise tracking information, the controller 10 can issue appropriate control signals to each individual yaw drive unit 3 as necessary in order to minimize the force applied by its pinion to a damaged yaw ring tooth.

For example, a damaged tooth $20_F$, $20_X$ may be defined by its angular position $\theta_{20F}$, $\theta_{20X}$ relative to the reference point $R_2$. Alternatively, the position of a damaged tooth $20_F$, $20_X$ may be its count number relative to a reference point $R_{52}$ of the bedframe 52. For example, if the tooth at the reference point $R_{52}$ is given the number 0, the position of the damaged tooth $20_F$ in this exemplary embodiment would be the number 10. In one embodiment, the damage descriptor $D_{20F}$, $D_{20X}$ for a damaged tooth simply comprises the position of the damaged tooth, and the controller 10 can be configured to control the yaw drive units 3 so that none of the yaw drive units exert any force on the damaged tooth during a rotation of the yaw ring, or when the yaw drive units are being used to "park" the nacelle in a specific position.

The extent or severity of the damage may also be input to the controller 10 by means of a suitable user interface 11. For example, a number between one and five may define the severity of the damage, with "one" indicating a slight fracture and "five" indicating a missing or broken tooth. In another embodiment, therefore, the damage descriptor $D_{20F}$, $D_{20X}$ for a damaged tooth comprises the position of the damaged tooth as well as a number indicating the severity of the damage. The controller 10 can be configured to control the yaw drive units 3 so that, whenever the damaged tooth is passing a yaw drive unit, the relevant yaw drive unit only exerts a force that can be safely withstood by the damaged tooth. For example, when a number between one and five defines the extent of the damage, the controller 10 may control the yaw drive units 3 as appropriate to only exert a fraction of full torque on the damaged tooth when the damage is classified as "three" or less, and to not apply any force to that tooth when the damage is classified as "four" or greater.

Figure 4:
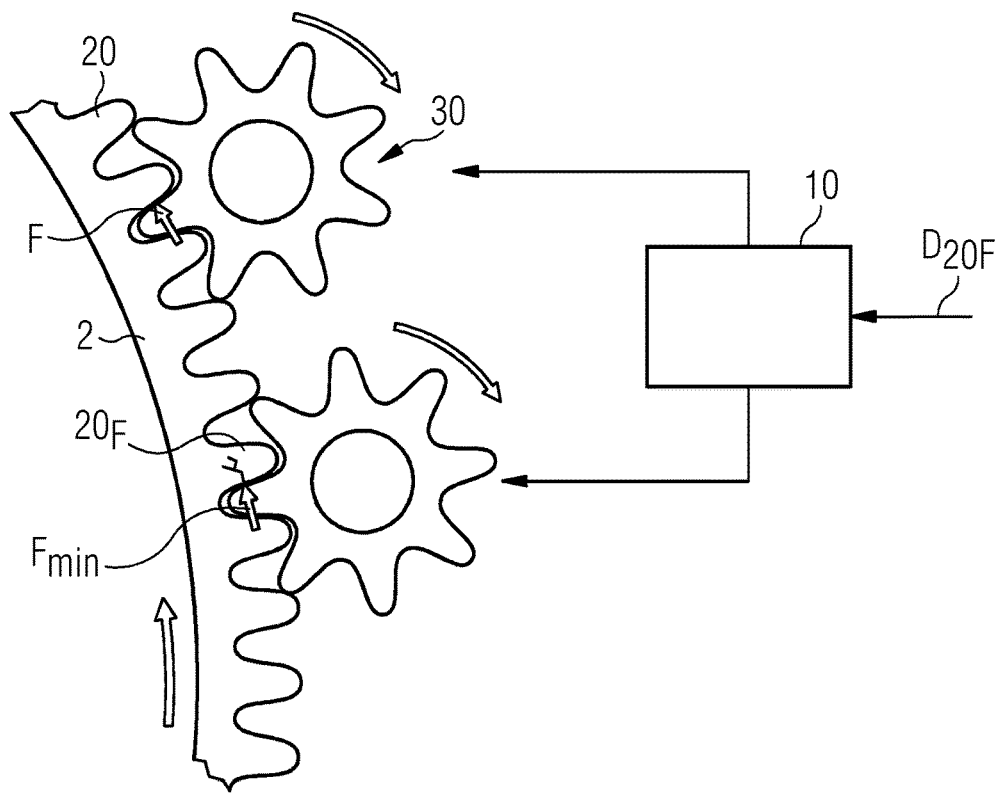
FIG. 4 shows the effect of the inventive method of operating a wind turbine yaw assembly.

FIG. 4 shows the effect of the inventive method of operating a wind turbine yaw assembly. The diagram shows (greatly simplified) a yaw ring 2, the pinions 30 of two yaw drive units, and a controller 10. The controller 10 has received a damage descriptor $D_{20F}$ for a fractured yaw ring tooth $20_F$. The controller 10 tracks the position of each yaw drive unit and pinion relative to each tooth of the yaw ring 2. As long as a pinion does not pass a damaged tooth, the controller 10 will control the relevant yaw drive unit(s) at the speed and torque required to carry out the desired rotation. This is indicated in the diagram by the arrow representing full force F being exerted by a pinion on a healthy yaw ring tooth 20. However, when a pinion is due to pass a damaged tooth, the controller 10 will reduce the speed and/or torque of the relevant yaw drive unit so that the damaged tooth $20_F$ is not stressed any further. This is indicated in the diagram by the arrow representing the reduced force $F_{min}$ being exerted by a pinion on the damaged yaw ring tooth $20_F$.

Figure 5:
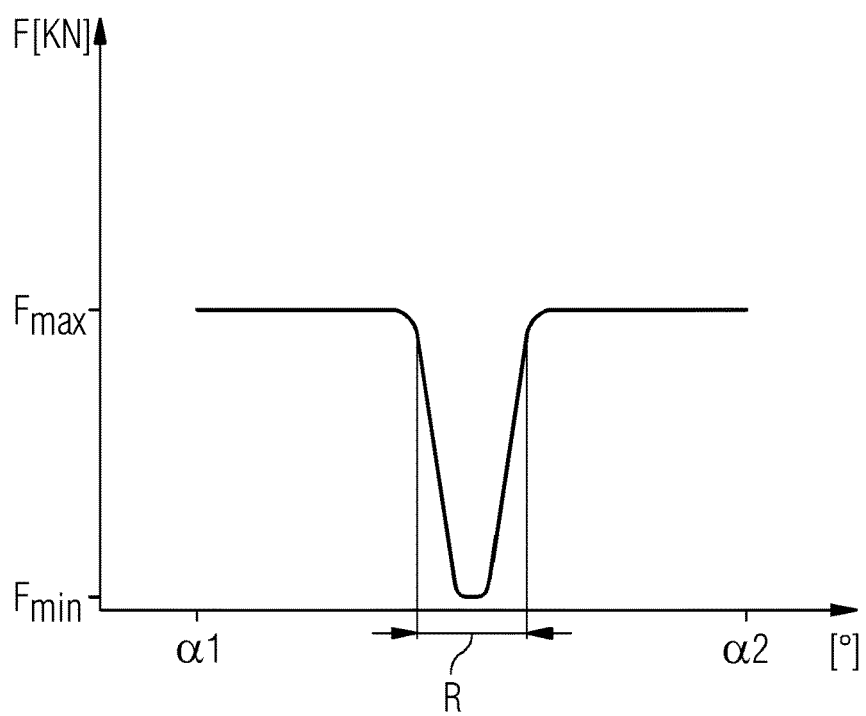
FIG. 5 illustrates the force applied by a pinion passing a damaged tooth in an embodiment of the inventive method.

FIG. 5 shows an example of the force applied by a pinion of a yaw drive unit to the teeth of a yaw ring as the pinion passes a damaged tooth, in an embodiment of the inventive method. The yaw drive controller has previously been informed of the presence of a damaged tooth, and "knows" that the damaged tooth is in a region R of the yaw ring. The yawing procedure is to turn the nacelle through a certain number of degrees, represented by the $\alpha 1$-$\alpha 2$ span along the X axis. The yaw drive controller issues appropriate control signals to the yaw drive motors so that, as a pinion passes healthy teeth, the pinion exerts full force $F_{max}$ to the healthy teeth, but as a pinion passes the damaged tooth, it will only exert a negligible force $F_{min}$ to the damaged tooth.

Figure 6:
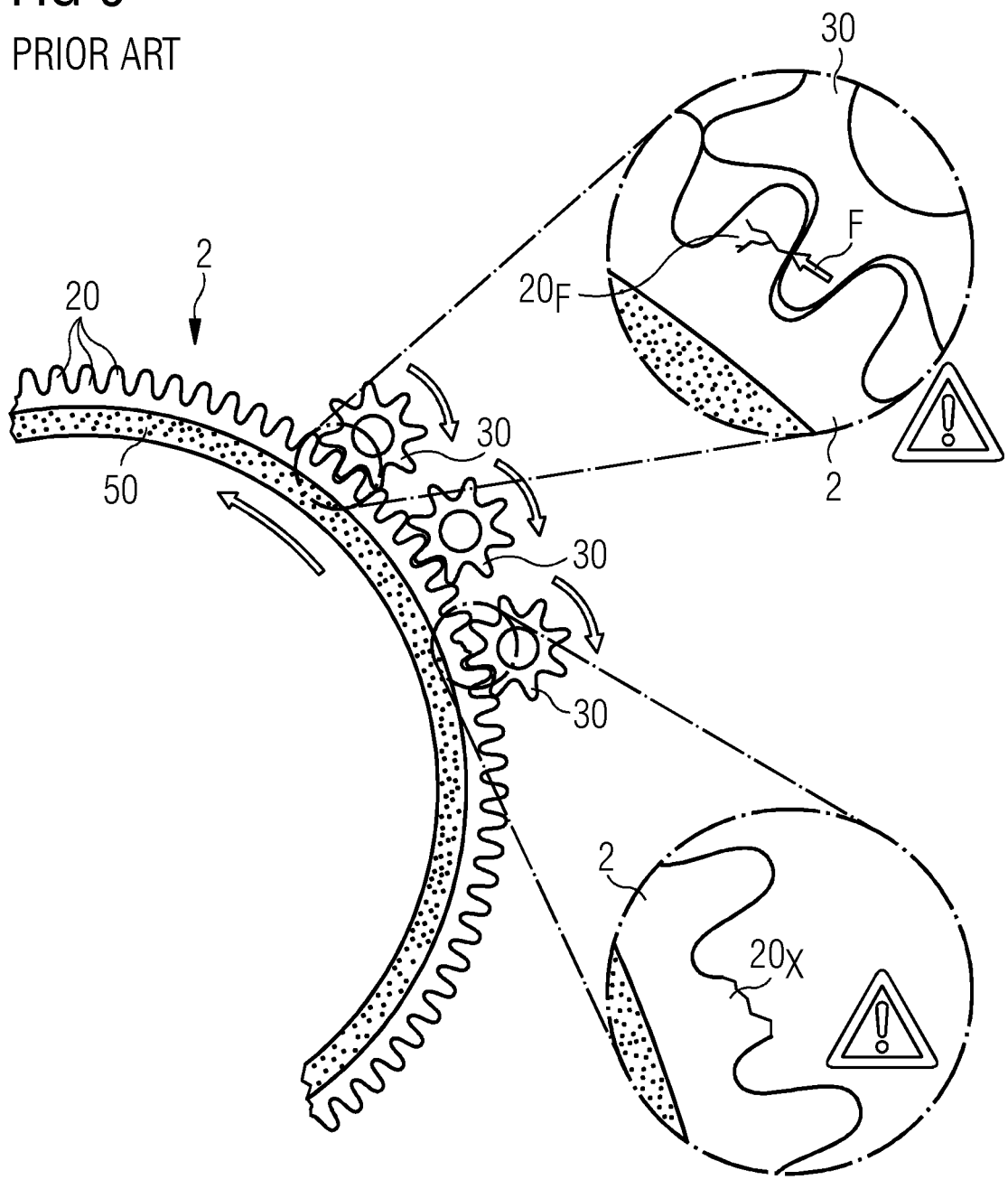
FIG. 6 shows the effect of a prior art method of operating a wind turbine yaw assembly.

FIG. 6 shows the effect of a prior art method of operating a wind turbine yaw assembly. The diagram shows (greatly simplified) a yaw ring 2 and the pinions 30 of three yaw drive units. A controller (not shown) is operating the yaw drive unit(s) at the speed and torque required to carry out a desired rotation (indicated by the rotation arrows). When a pinion passes a fractured tooth $20_F$, the full force F exerted by the pinion will stress the fractured tooth $20_F$ even further, as shown in the upper left enlarged view. As a result, the fractured tooth $20_F$ may ultimately break off entirely and become a broken tooth $20_X$, as shown in the lower right enlarged view. As explained above, a fractured tooth could be repaired by welding, and a broken tooth might be repaired by welding a replacement tooth onto the yaw ring or by securing a suitably shaped plate into place on the yaw ring. However, such a repaired tooth is a weak element, and the known art approach of operating the yaw drive assembly in the usual manner means that the loads applied by the pinions will ultimately cause the repaired tooth to fail again, so that replacement of the yaw ring becomes inevitable.

Although the present invention has been disclosed in the form of preferred embodiments and variations thereon, it will be understood that numerous additional modifications and variations could be made thereto without departing from the scope of the invention. For example, the inventive idea could find use in a rotor blade pitch system which uses a toothed pitch ring and a motor-driven pinion to pitch the rotor blade. In another realisation, the yaw drive motors may be constructed using stepper motors. In the case of a broken-off tooth, a yaw drive unit would be controlled to make its pinion rotate at the normal speed, so that poor meshing does not become a problem.

For the sake of clarity, it is to be understood that the use of "a" or "an" throughout this application does not exclude a plurality, and "comprising" does not exclude other steps or elements.

The invention claimed is:

1. A method of operating a wind turbine yaw assembly comprising a yaw ring and a number of yaw drive units, wherein a yaw drive unit comprises a pinion arranged to engage with the yaw ring, which method comprises the steps of
identifying a damaged tooth on the yaw ring;
providing damage descriptor parameters to a yaw drive controller; and
controlling a yaw drive unit on the basis of the damage descriptor parameters to reduce the force exerted by its pinion on a damaged tooth.

2. The method according to claim 1, wherein the step of controlling a yaw drive unit to reduce the force exerted by its pinion on the damaged tooth comprises reducing the rotational speed of a motor of the yaw drive unit.

3. The method according to claim 1, wherein the step of controlling a yaw drive unit to reduce the force exerted by its pinion on the damaged tooth comprises reducing the torque of the motor of that yaw drive unit to at most 5%, more preferably at most 1%, of full torque.

4. The method according to claim 1, wherein the step of reducing the force exerted by a pinion on a damaged tooth is carried out during a yawing procedure of the nacelle and/or during a braking procedure.

5. The method according to claim 1, wherein the step of identifying a damaged tooth comprises establishing the position of a damaged tooth relative to a reference position of the yaw assembly.

6. The method according to claim 5, wherein a reference position defines an initial position of a yaw bedframe supporting the yaw drive units.

7. The method according to claim 5, wherein the reference position comprises a north reference of the yaw ring, which north reference is aligned with the yaw bedframe reference position in an initial position of the yaw assembly.

8. The method according to claim 1, wherein the step of identifying a damaged tooth comprises establishing a damage severity parameter describing the extent of damage of the damaged tooth.

9. A wind turbine yaw assembly arranged at an interface between a nacelle and a tower of a wind turbine, and comprising
a yaw ring with an annular arrangement of teeth;
a number of yaw drive units, wherein a yaw drive unit comprises a motor and a pinion arranged to engage with teeth of the yaw ring;
a yaw drive controller adapted to control the motor of a yaw drive unit to effect a rotation of the nacelle relative to the tower;
wherein
a damage descriptor input for providing damage descriptor parameters to the yaw drive controller, and wherein the yaw drive controller is further adapted to reduce the force exerted by a pinion of a yaw drive unit on a damaged tooth on the basis of the damage descriptor parameters.

10. The wind turbine yaw assembly according to claim 9, comprising a redundant arrangement of yaw drive units.

11. The wind turbine yaw assembly according to claim 9, wherein a yaw drive unit comprises a passive brake assembly.

12. The wind turbine comprising a yaw assembly according to claim 9.

13. A computer program product, comprising a computer readable hardware storage device having computer readable program code stored therein, said program code executable by a processor of a computer system to implement a method comprising a computer program that is directly loadable into a memory of a controller of a wind turbine yaw assembly and which comprises program elements for performing steps of the method according to claim 1 when the computer program is executed by the controller of the wind turbine yaw assembly.

14. A computer program product, comprising a computer readable hardware storage device having computer readable program code stored therein, said program code executable by a processor of a computer system to implement a method according to claim 13, comprising program elements realized to receive a damage severity parameter and to adjust the control signals of a yaw drive unit on the basis of the damage severity parameter.

15. A computer program product, comprising a computer readable hardware storage device having computer readable program code stored therein, said program code executable by a processor of a computer system to implement a method according to claim 13, comprising program elements realized to identify a yaw ring region containing a damaged tooth and to adjust control signals of a yaw drive unit as the yaw drive unit passes that region of the yaw ring.

* * * * *